(12) United States Patent
Brant

(10) Patent No.: US 6,590,055 B2
(45) Date of Patent: Jul. 8, 2003

(54) ELECTRICAL DEVICES FROM POLYMER RESINS PREPARED WITH IONIC CATALYSTS

(75) Inventor: Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 104 days.

(21) Appl. No.: 09/745,232

(22) Filed: Dec. 20, 2000

(65) Prior Publication Data

US 2002/0004567 A1 Jan. 10, 2002

Related U.S. Application Data

(60) Provisional application No. 60/172,737, filed on Dec. 20, 1999.

(51) Int. Cl.[7] .................. C08F 110/02; C08F 210/16
(52) U.S. Cl. .................. 526/348; 526/129; 526/130; 526/160; 526/348.6; 526/134; 428/461; 428/462; 428/36.8; 174/110 SR
(58) Field of Search .............. 526/348; 428/461, 428/462

(56) References Cited

U.S. PATENT DOCUMENTS

| | | | |
|---|---|---|---|
| 4,543,399 | A | 9/1985 | Jenkins, III et al. |
| 4,588,790 | A | 5/1986 | Jenkins, III et al. |
| 4,871,705 | A | 10/1989 | Hoel |
| 4,892,851 | A | 1/1990 | Ewen et al. |
| 4,937,299 | A | 6/1990 | Ewen et al. |
| 5,001,205 | A | 3/1991 | Hoel |
| 5,017,714 | A | 5/1991 | Welborn, Jr. |
| 5,028,670 | A | 7/1991 | Chinh et al. |
| 5,153,157 | A | 10/1992 | Hlatky et al. |
| 5,153,282 | A | 10/1992 | Datta et al. |
| 5,198,401 | A | 3/1993 | Turner et al. |
| 5,241,025 | A | 8/1993 | Hlatky et al. |
| 5,246,783 | A | 9/1993 | Spenadel et al. |
| 5,278,119 | A | 1/1994 | Turner et al. |
| 5,278,264 | A | 1/1994 | Spaleck et al. |
| 5,278,272 | A | 1/1994 | Lai et al. |
| 5,296,434 | A | 3/1994 | Karl et al. |
| 5,304,614 | A | 4/1994 | Winter et al. |
| 5,308,816 | A | 5/1994 | Tsutsui et al. |
| 5,318,935 | A | 6/1994 | Canich et al. |
| 5,324,800 | A | 6/1994 | Welborn, Jr. et al. |
| 5,405,922 | A | 4/1995 | DeChellis et al. |
| 5,407,884 | A | 4/1995 | Turner et al. |
| 5,408,017 | A | 4/1995 | Turner et al. |
| 5,427,991 | A | 6/1995 | Turner |
| 5,462,999 | A | 10/1995 | Griffin et al. |
| 5,502,124 | A | 3/1996 | Crowther et al. |
| 5,504,049 | A | 4/1996 | Crowther et al. |
| 5,552,504 | A | 9/1996 | Bennett et al. |
| 5,599,761 | A | 2/1997 | Turner |
| 5,635,573 | A | 6/1997 | Harrington et al. |
| 5,643,847 | A | 7/1997 | Walzer, Jr. |
| 5,696,213 | A | 12/1997 | Schiffino et al. |

(List continued on next page.)

FOREIGN PATENT DOCUMENTS

| | | |
|---|---|---|
| EP | 0 129 368 A | 12/1984 |
| EP | 0 340 688 A2 | 11/1989 |
| EP | 0 577 581 A | 1/1994 |
| EP | 0 578 838 A | 1/1994 |
| EP | 0 589 638 A2 | 3/1994 |
| EP | 0 570 982 B | 1/1997 |
| EP | 0 418 044 B | 9/1997 |
| EP | 0 591 756 B | 11/1998 |
| WO | WO 96/33227 | 10/1965 |
| WO | WO 91/09882 | 7/1991 |
| WO | WO 92/00333 | 1/1992 |
| WO | WO 92/10066 | 6/1992 |
| WO | WO 93/04486 | 3/1993 |
| WO | WO 93/11172 | 6/1993 |
| WO | WO 93/14132 | 7/1993 |
| WO | WO 94/01471 | 1/1994 |
| WO | WO 94/03506 | 2/1994 |
| WO | WO 95/07941 | 3/1995 |
| WO | WO 96/04319 | 2/1996 |
| WO | WO 96/40805 | 12/1996 |
| WO | WO 97/22635 | 6/1997 |
| WO | WO 97/22639 | 6/1997 |
| WO | WO 97/29845 | 8/1997 |
| WO | WO 97/48735 | 12/1997 |
| WO | WO 98/37109 | 8/1998 |
| WO | WO 98/55518 | 12/1998 |
| WO | WO 99/09306 | 2/1999 |
| WO | WO 99/30822 | 6/1999 |
| WO | WO 99/45040 | 9/1999 |
| WO | WO 99/45041 | 9/1999 |
| WO | WO 99/45042 | 9/1999 |

OTHER PUBLICATIONS

Britovsek et al., "Novel Olefin Polymerization Catalysts Based on Iron and Cobalt" *Chem. Commun.*, 1998 pp. 849–850.

U.S. patent application Ser. No. 09/351,983 filed Jul. 12, 1999.

U.S. patent application Ser. No. 09/302,243 filed Apr. 29, 1999.

U.S. patent application Ser. No. 08/991,160 filed Dec. 16, 1997.

(List continued on next page.)

*Primary Examiner*—David W. Wu
*Assistant Examiner*—R. Rabago
(74) *Attorney, Agent, or Firm*—Charles E. Runyan

(57) ABSTRACT

This invention relates to olefin polymers particularly suited to satisfying the dielectric properties required in electrical device use. The olefin polymers can be prepared by contacting polymerizable olefin monomers with catalyst complexes of Group 3–11 metal cations and noncoordinating or weakly coordinating anion compounds bound directly to the surfaces of finely divided substrate particles or to polymer chains capable of effective suspension or solvation in polymerization solvents or diluents under solution polymerization conditions. Thus, the invention includes polyolefin products prepared by the invention processes, particularly ethylene-containing copolymers, having insignificant levels of mobile, negatively charged particles as detectable by Time of Flight SIMS.

9 Claims, No Drawings

U.S. PATENT DOCUMENTS

| | | | |
|---|---|---|---|
| 5,763,533 | A | 6/1998 | Dharmarajan et al. |
| 5,763,556 | A | 6/1998 | Shaffer et al. |
| 5,767,208 | A | 6/1998 | Turner et al. |
| 5,837,787 | A | 11/1998 | Harrington |
| 5,851,945 | A | 12/1998 | Turner et al. |
| 5,939,347 | A | 8/1999 | Ward et al. |
| 5,962,132 | A | 10/1999 | Chang et al. |
| 2001/0039320 | A1 * | 11/2001 | Jacobsen et al. ......... 526/348.2 |

OTHER PUBLICATIONS

U.S. patent application Ser. No. 09/408,050 filed Sep. 29, 1999.

U.S. patent application Ser. No. 09/261,637 filed Mar. 3, 1999.

Scollard et al., "Polymerization of α–Olefins by Chelating Diamide Complexes of Titanium", *Macromolecules* 1996, v.29—pp. 5241–5243.

Britovsek et al., "The Search for New–Generation Olefin Polymerization Catalysts . . . ", *Angew. Chemie., Int. Ed.* 1999, v.38—pp. 428–447.

Stehling et al., "ansa–Zirconocene Polymerization Catalysts with Annelated Ring Ligands . . . " *Organometallics* 1994, v.13—pp. 964–970.

Scollard et al., "Sterically Demanding Diamide Ligands . . . ", *Organometallics* 1995, v.14, pp. 5478–5480.

Wiesenfeldt et al., "ansa–Metallocene Derivatives XVII . . . ", *J. of Organometallic Chem* . . . , v.369 (1989)—pp. 359–370.

Spaleck et al., "The Influence of Aromatic Substituents on the Polymerization Behavior of Bridged Zirconocene Catalysts", *Organometallics*, 1994, v. 13, pp. 954–963.

Brant, et al., "Detection of $B(C_6F_5)_4$ anions in Polyethylenes Made with Ionic Metallocene Catalysts"—*Journal of Materials Science Letters* 19 (2000)—pp. 189–191.

Brunauer, S. et al., "Adsorption of Gases in Multimolecular Layers"—*JACS*, 1938, v.60—pp. 309–319.

* cited by examiner

ELECTRICAL DEVICES FROM POLYMER RESINS PREPARED WITH IONIC CATALYSTS

This Application is based on Provisional Application U.S. Ser. No. 60/172,737 filed Dec. 20, 1999.

TECHNICAL FIELD

This invention relates to polymeric products that are particularly useful for electrical devices and to olefin polymerization processes that use supported catalyst compounds where the catalysts are attached to support materials.

BACKGROUND

Common examples of electrical devices include wire and cable applications. Typical power cables include one or more electrical conductors in a core that is surrounded by several layers that can include a polymeric semi-conducting shield layer, a polymeric insulating layer and another polymeric semi-conducting shield layer, a metallic tape, and a polymeric jacket. Thus, a wide variety of polymeric materials have been used as electrical insulating and semi-conducting shield materials for wire, cable, and numerous other electrical applications.

Polymerized elastomer or elastomer-like polymers are often used in power cables. Ethylene, $C_3$–$C_{12}$ α-olefin, and $C_5$–$C_{20}$ non-conjugated diene monomers form these elastic materials. Polymers containing ethylene, either homopolymers or copolymers with $C_3$–$C_{20}$, olefinically unsaturated comonomers, are also used as insulating layers or semiconducting layers. See for example, U.S. Pat. Nos. 5,246,783, 5,763,533, International Publication WO 93/04486, and generally, "Electric Insulation", *Kirk-Othmer Encyclopedia of Chemical Technology*, 4th Ed., pages 627–647 (John Wiley & Sons, 1993). Dielectric strength, electrical resistivity, electrical conductivity, and dielectric constant are all important characteristics for these applications.

Polymerization of olefinically unsaturated monomers is well known and has led to the proliferation of elastomeric and plastic materials, such as polyethylene, polypropylene, and ethylene-propylene rubber. Catalyst compounds with bulky, stabilizing-ligand-containing metal cation components are now well known in the art. Examples include cyclopentadienyl-ligand-containing transition metal compounds (e.g., metallocenes), bisamido- and bisimido-ligand-containing transition metal compounds, as well as other metal compounds that are stabilized by incorporating bulky ligands. Cocatalyst compounds containing, or capable of providing, non-coordinating anions can be used to stabilize the transition metal cations and maintain their cationic form rendering them suitable for olefin oligomerization and polymerization, see for example U.S. Pat. No. 5,198,401. This and related references describe metallocene compound protonation by anion precursors to form stable catalysts.

U.S. Pat. Nos. 5,427,991, and 5,643,847 specifically teach the use of anionic complexes directly bound to supports through chemical linkages to improve polymerization processes that are conducted under slurry or gas-phase polymerization conditions. See also U.S. Pat. No. 5,939,347 which addresses protonating or abstracting cocatalyst activators bound to silica.

Low crystallinity ethylene-containing elastomers and ethylene-containing polymers can be produced under gas-phase or slurry conditions, but are more typically prepared by solution polymerization processes, in part because these polymers have good solubility in commonly used hydrocarbyl solvents see the supported-catalyst references cited above. Examples include: U.S. Pat. Nos. 5,198,401 (above), 5,278,272, 5,408,017, 5,696,213, 5,767,208 and 5,837,787; and, EP 0 612 678, EP 0 612 679, International Applications WO 99/45040 and WO99/45041. Although each reference, in part, addresses ethylene-containing polymers prepared with ionic catalyst compounds; preparing satisfactory electrical device polymers from these solution processes has unsolved problems. Using noncoordinating or weakly coordinating anion cocatalyst complexes poses a problem because it leaves labile, anionic-charge-carrying species as a byproduct within the resulting polymeric resins or matrices. These mobile anions adversely affect both dielectric strength and dielectric constant.

Additionally, olefin solution polymerization processes are generally conducted in aliphatic solvents that serve both to maintain reaction temperatures and solvate the polymer products. But aryl-group-containing catalysts, those having cyclopentadienyl derivatives and other fused or pendant aryl-group substituents, are sparingly soluble in such solvents and typically are introduced in the aryl solvents such as toluene. Because of health concerns, the aryl solvent must be removed. Also, aryl solvents reduce process efficiencies making their presence undesirable. Alternatively, relatively insoluble catalysts can be introduced using slurry methods, but such methods required specialized handling and pumping procedures that complicate industrial scale plant design and add significant costs to plant operation. Typical slurry compositions cause significant wear on pumps, piping, joints, and connectors. Low solubility also poses a problem when the processes involve low temperature operation at some stage such as typically seen in adiabatic processes run in colder climates. The adiabatic reactor is operated at ambient temperature. Thus, the catalyst's low solubility is further lowered by a colder reaction temperature. Additionally, counteracting the build-up of aryl solvents in the recycle system, or separating them from the system, presents added problems. At the same time, maintaining high molecular weights in olefin polymers while operating at economically preferable high reaction temperatures and high production rates is highly desirable.

INVENTION DISCLOSURE

In part, this invention is a method for preparing olefin polymers. The method includes contacting olefin monomers with a catalyst system containing Group-3 to -11 metal-cation complexes that are surface bound to a substrate. The substrate is finely divided particles that can be effectively suspended in or solvated by reaction solvents or diluents. Thus, the invention, in part, relates to a process for preparing olefin-polymerization-catalyst compositions that contain particulate or polymeric support material connected to the catalyst activator and a Group 3–11, metal-catalyst-precursor compound that can be activated for olefin polymerization. One goal is to substantially immobilize the activator so that after activation, the resulting non-coordinating anion and the catalyst are trapped within the substrate. Another goal is to modify the catalyst system so that it is soluble in the aliphatic polymerization solvent, or if not soluble, suspendable in the solvent such that the abrasive effect (as well as other negative effects faced in slurry polymerization) is substantially eradicated. This is done to prevent ion-based conduction in the resulting polymer. Additionally, the invention includes the polymer products prepared by the invention processes, particularly ethylene-containing polymers having insignificant levels of mobile, negatively charged particles as detectable by Time-of-Flight SIMS spectra.

Furthermore, the inventor also relates to the cocatalyst and catalyst system compositions using support-bound cocatalysts.

DETAILED DESCRIPTION AND EXAMPLES OF THE INVENTION

The advantages of olefin solution polymerization generally, and ethylene polymerization particularly, can be effectively extended by use of the invention process. The suspended, supported catalysts will meet the solution process requirements of pumpability and dispersability in the polymerization medium. Thus, the high activities or productivities enabled by systems based on aryl-group-containing catalysts and cocatalysts can be readily achieved without leaving noncoordinating or weakly coordinating anion residue in the polymer resins. Additionally, difficulties associated with using bulky-ligand-containing, organometallic, catalyst and cocatalyst activator compounds in which the presence of aryl- and haloaryl-group ligands (such as, phenyl, perfluorophenyl, napthyl, perfluoronapthyl, cyclopentadienyl, indenyl, fluorenyl, etc.) inhibit aliphatic solvent solubility can be overcome using the invention's supported catalyst and cocatalyst compounds because the compounds are easily suspendable in aliphatic solvents.

Description of Support Materials

Support material suitable for use with the invention can be any of the inorganic oxide or polymeric support materials that 1) have, or can be treated to have, reactive functional groups for connecting or chemically binding the catalyst or cocatalyst and 2) are small enough or constitutes such that they disperse or dissolve in aliphatic solvents. Some embodiments include finely divided substrate particles that are essentially colloidal in size, or more quantitatively, less than or equal to about 2 microns, and are substantially non-porous. The particles can be essentially pore-free since reaction exotherm control depends more on the presence of the solution processes' solvent or diluent.

Suitable support materials include commercially available pyrogenic silicas, commonly called fumed silicas. A typical silica preparation process uses vapor-phase hydrolysis of silicon tetrachloride at around 1000° C. Other methods include $SiO_2$ vaporization, Si vaporization and oxidation, and high temperature oxidation and hydrolysis of silicon compounds such as silicate esters. Examples include the Aerosil™ and Cab-O-Sil™ of Degussa and Cabot Corp. respectively. Even after high temperature preparation, these silica products retain enough silanol groups to connect with the cocatalyst precursor. The silanol groups are nucleophilic. It is believed that they react with the Lewis-acidic, cocatalyst precursors, such as trisperfluorophenyl borane. Furthermore, the particles' near-colloidal size permits dispersion in polymerization solvents and diluents, even after treatment with cocatalyst precursor compounds. In some embodiments, the treated particles form colloidal suspensions in aliphatic polymerization, or other compatible, solvents. Additional support materials include metal or metalloid compounds, such as oxides, that comprise significant amounts of hydroxyl-group-containing silica or silica equivalent. Examples include alumina, alumino-silicates, clays, talcs, or other silica-containing Group-14 metalloid-metal element compounds. R. P. H. Chang, J. M. Lauerhaus, T. J. Marks, U. C. Pernisz, "Silica Nanoparticles Obtained From a Method Involving a Direct Current Electric Arc in an Oxygen-Containing Atmosphere", U.S. Pat. No. 5,962,132, Oct. 5, 1999, describes methods of preparing silica particles of less than 100 nm diameter. This patent is incorporated by reference for the purposes of U.S. Patent Practice.

In some embodiments, polymeric supports include polystyrene gels or beads having a 2 micron or less mesh size. It is believed that internals pores are unnecessary in some embodiments because the catalyst or cocatalyst attaches to the bead or gel surface materials. The solution-based polymerization conditions help to eliminate particle size concerns seen in typical gas phase or slurry polymerizations. Thus, in some embodiments, the surface area is less than about 300 $m^2/g$, even less than 200 $m^2/g$ as measured by single point nitrogen B.E.T. analysis (Brunauer, S., Emmett, P. H., Teller, E., *JACS* 1938, 60, 309). The cocatalyst precursors can be attached using any means that permit substantial connection to the substrate. See for instance U.S. Pat. Nos. 5,427,991, 5,643,847, 5,939,347, WO 98/55518 and co-pending U.S. application Ser. No. 09/351,983 filed Jul. 12, 1999 (Atty. Docket No. 98B041) now abandoned. Each is incorporated by reference for purposes of U.S. patent practice.

Additional support materials include the essentially amorphous or semicrystalline aliphatic-solvent-soluble polyolefins, for example, ethylene-containing polymers that contain nucleophilic groups for reacting with Lewis acid cocatalyst precursors. Various means of incorporating nucleophilic groups into these polymers such that they react with the Lewis acidic precursors are known in the art. See, U.S. Pat. Nos. 5,153,282, 5,427,991, and WO 98/55518. Some polymer embodiments, such as those from ethylene, α-olefin monomers, or optionally containing non-conjugated diolefin comonomers grafted with maleic anhydride, are suitable. After the treatment with the cocatalyst or after reaction with transition metal catalyst precursor, the substrate polymer should be readily dispersible or dissolvable. This means that the untreated substrate should contain little enough crosslinking so that it remains soluble or dispersible in the polymerization solvent after treatment with the cocatalyst or catalyst precursor.

The silica-based support can be fluorinated after dehydration to decrease the number of catalyst-degrading, surface functionalities. Suitable fluoridating compounds are typically inorganic. They may be any that contain fluorine as long as they do not contain a carbon atom. Some embodiments use inorganic fluorine-containing compounds such as $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$, and $NH_4HF_2$. Of these, ammonium hexafluorosilicate and ammonium tetrafluoroborate are particularly useful.

Ammonium hexafluorosilicate and ammonium tetrafluoroborate fluorine compounds are typically solid particulates. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after their addition to support, dehydration, or calcination vessels. Accordingly, the fluorine concentration present on the support is in the range of from 0.6 to 3.5 wt % of support.

In another method, the fluorine is dissolved in a solvent such as water and then the support is contacted with the fluorine-containing solution. When water is used and silica is the support, it is desirable to use a quantity of water that is less than the total pore volume of the support.

Silica dehydration or calcination is not necessary before reacting it with the fluorine compounds. Desirably, the reaction between the silica and fluorine compound is carried out at a temperature of from about 100° C. to about 1000° C., and more desirably from about 200° C. to about 600° C. for about two to eight hours.

The term noncoordinating anion as used for the invention compounds is art-recognized to mean an anion that either does not coordinate to the transition metal cation or that coordinates weakly enough to be displaced by a neutral Lewis base. "Compatible" noncoordinating anions (NCA) are those which are not neutralized when reacted with the catalyst precursor compounds. Further, the compatible anion should not transfer anionic substituents or fragments to the catalyst to form a neutral metal compound and a neutral NCA by-product. Noncoordinating anions useful with invention embodiments are those that are compatible with or stabilize the invention transition metal cation by balancing its ionic charge, yet can be displaced by an olefinically unsaturated monomer during polymerization. Additionally, because the anions are support bound, it is believed that they have sufficient size to inhibit or prevent neutralization of the invention catalysts by any extraneous Lewis bases present in the reaction. Suitable aryl ligands for the invention include those of the noncoordinating anions as described in U.S. Pat. Nos. 5,198,401, 5,278,119, 5,407,884, and 5,599,761. Specific examples include the phenyl, napthyl, and anthracenyl radicals of U.S. Pat. No. 5,198,401, the biphenyl radicals of WO 97/29845, and the ligands of the noncoordinating anions of WO 99/45042, preferably where a majority of ring-hydrogen atoms are replaced with halogens. All documents are incorporated by reference for purposes of U.S. patent practice. In some embodiments, the anions' sources are neutral, tri-coordinate Lewis acids that contain aryl-substituted boron or aluminum, and that are reactive with the support material's nucleophilic groups, e.g., hydroxyl groups of the fumed silica or polymer substrate. Trisperfluorophenyl borate, trisperfluoronapthylborate, and trisperfluorobiphenylborate are examples.

Invention, supported catalysts can be prepared by adding organometallic, transition-metal catalyst-precursor compounds into a well-stirred or well-mixed solution or suspension of the fine-particle- or polymeric-supported cocatalysts long enough to allow the cocatalyst to ionize the catalyst precursor into cationic catalysts. The catalyst and cocatalyst reaction can be conducted at ambient temperature or can be warmed to 40° C. or higher to facilitate the reaction. The reaction product is a catalytic, cationic metal complex connected to the support-bound noncoordinating or weakly coordinating anion. The catalyst-cocatalyst complex can then be directly added into a reactor, or can be dried or separated from the suspension for subsequent polymerization.

Transition metal compounds suitable as polymerization catalysts in accordance with the invention include the known transition metal compounds useful in traditional Ziegler-Natta polymerization and as well the metallocene compounds similarly known to be useful in polymerization. The compounds are suitable when the invention cocatalyst activators can catalytically activate them. These typically include Group-3–11 transition metal compounds in which at least one metal ligand can be protonated by the cocatalyst activators, particularly those ligands including hydride, alkyl, and silyl, and lower alkyl-substituted ($C_1$–$C_{10}$) silyl or alkyl derivatives of those. Ligands capable of abstraction and transition metal compounds comprising them include those described in the background art, see for example U.S. Pat. No. 5,198,401 and WO 92/00333. Syntheses of these compounds are well known from the published literature.

Additionally, where the metal ligands include halide, amido, or alkoxy moieties (for example, biscyclopentadienyl zirconium dichloride) that the invention cocatalysts can't abstract, the moieties can be converted into suitable ligands through known alkylation reactions with lithium or aluminum hydrides or alkyls, alkylalumoxanes, Grignard reagents, etc. See also EP-A1-0 570 982 for organoaluminum compounds reaction with dihalo-substituted metallocene compounds before adding an activator. All documents are incorporated by reference for purposes of U.S. patent practice.

Additional description of metallocene compounds that comprise, or can be alkylated to comprise, at least one ligand capable of abstraction to form a catalytically active transition metal cation appear in the patent literature, e.g., EP-A-0 129 368, U.S. Pat. Nos. 4,871,705, 4,937,299, 5,324,800 EP-A-0 418 044, EP-A-0 591 756, WO-A-92/00333, WO-A-94/01471 and WO 97/22635. Such metallocene compounds are mono- or biscyclopentadienyl-substituted Group-3, -4, -5, or -6 transition metal compounds in which the ligands may themselves be substituted with one or more groups or may bridge to each other or to the transition metal through a heteroatom. The size and constituency of the ligands and bridging elements are not critical to preparing the invention catalyst systems, but should be selected in the literature-described manner to enhance the desired polymerization activity and polymer characteristics. In some embodiments, the cyclopentadienyl rings (including substituted cyclopentadienyl-based fused-ring systems, such as indenyl, fluorenyl, azulenyl, or their substituted analogs), when bridged to each other, will be lower-alkyl-substituted ($C_1$–$C_6$) in the 2 position (with or without a similar 4-position substituent in the fused-ring systems) and may additionally comprise alkyl, cycloalkyl, aryl, alkylaryl, or arylalkyl substituents, the latter as linear, branched, or cyclic structures including multi-ring structures, for example, those of U.S. Pat. Nos. 5,278,264 and 5,304,614. Such substituents should each have essentially hydrocarbyl characteristics and will typically contain up to 30 carbon atoms, but may be heteroatom-containing with 1–5 non-hydrogen or carbon atoms, e.g., N, S, O, P, Ge, B and Si. All documents are incorporated by reference for purposes of U.S. patent practice.

Metallocene compounds suitable for the preparation of linear polyethylene or ethylene-containing polymers (where copolymer means formed from at least two different monomers; for this disclosure, "polymer" completely encompasses all varieties of homo-, hetero, copolymers) are essentially any of those known in the art, see again WO-A-92/00333 and U.S. Pat. Nos. 5,001,205, 5,198,401, 5,324,800, 5,304,614 and 5,308,816, for specific listings. Selection of metallocene compounds for use to make isotactic or syndiotactic polypropylene, and their syntheses, are well-known in both the patent and academic literature, see for example *Journal of Organometallic Chemistry*, 369, 359–370 (1989). Typically, those catalysts are stereorigid, asymmetric, chiral, or bridged-chiral metallocenes. See, for example, U.S. Pat. No. 4,892,851, U.S. Pat. No. 5,017,714, U.S. Pat. No. 5,296,434, U.S. Pat. No. 5,278,264, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, *Organometallics* 1994, 13, 954–963, and "ansa-Zirconocene Polymerization Catalysts with Annelated Ring Ligands-Effects on Catalytic Activity and Polymer Chain Lengths", Brinzinger, H., et al, *Organometallics* 1994, 13, 964–970, and documents referred to in the references. Although these references are directed to catalyst systems with alumoxane activators, some analogous precursors will be useful with invention cocatalyst activators. A suitable catalyst precursor typically has 1) one or more ligands that have been replaced with an abstractable ligand; and 2) one or more ligands into which an ethylene group, —C═C—, can insert. Examples include hydride, alkyl, or silyl. All documents are incorporated by reference for purposes of U.S. patent practice.

Some representative metallocene compounds have the formula:

$$L^A L^B L^C_i MDE$$

where, $L^A$ is a substituted cyclopentadienyl or heterocyclopentadienyl ligand connected to M; $L^B$ is a member of the class of ligands defined for $L_A$, or is J, a heteroatom ligand connected to M; the $L^A$ and $L^B$ ligands may be connected together through a Group-14-element linking group; $L^C_i$ is an optional neutral, non-oxidizing ligand connected to M (i equals 0 to 3); M is a Group-4 or -5 transition metal; and, D and E are independently monoanionic labile ligands, each connected to M, optionally connected to each other or $L^A$ or $L^B$, in which the connection can be broken by a suitable activator and into which a monomer or macromonomer can insert for polymerization.

Non-limiting representative metallocene compounds include mono-cyclopentadienyl compounds such as pentamethylcyclopentadienyltitanium isopropoxide, pentamethylcyclopentadienyltribenzyl titanium, μ-dimethylsilyltetramethylcyclopenta-dienyl-tert-butylamido titanium dichloride, pentamethylcyclopentadienyl titanium trimethyl, dimethylsilyltetramethylcyclopenta-dienyl-tert-butylamido zirconium dimethyl, dimethylsilyltetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl, (tetramethylcyclopentadienyl)(n-propyl-cyclopentadienyl) zirconium dimethyl; bridged bis-cyclopentadienyl compounds such as dimethylsilylbis(tetrahydroindenyl) zirconium dichloride and silacyclobutyl (tetramethylcyclopentadienyl)(n-propyl-cyclopentadienyl) zirconium dimethyl; bridged bis-indenyl compounds such as dimethylsily-bisindenyl zirconium dichloride, dimethylsily-bisindenyl hafnium dimethyl, dimethylsilylbis(2-methylbenzindenyl) zirconium dichloride, dimethylsilylbis (2-methylbenzindenyl) zirconium dimethyl; and fluorenyl ligand-containing compounds, e.g., diphenylmethyl (fluorenyl)(cyclopentadienyl)zirconium dimethyl; and the additional mono- and biscyclopentadienyl compounds such as those listed and described in U.S. Pat. Nos. 5,017,714, 5,324,800 and EP-A-0 591 756. All documents are incorporated by reference for purposes of U.S. patent practice.

Representative traditional Ziegler-Natta transition metal compounds include tetrabenzyl zirconium, tetra bis (trimethylsilylmethyl) zirconium, oxotris (trimethylsilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride. The important features of such compositions for polymerization are the ligands capable of abstraction and the ligands into which the ethylene (olefinic) group can insert. These features enable ligand abstraction from the transition metal compound and the concomitant formation of the invention ionic catalyst compositions.

Additional transition metal polymerization catalysts in accordance with the invention will be any of those Group-3–10 compounds that can be converted by ligand abstraction into a catalytically active cation and stabilized in that state by a noncoordinating or weakly coordinating anion, as defined above.

Exemplary compounds include those described in the patent literature. International patent publications WO 96/23010, WO 97/48735 and Gibson, et. al., *Chem. Comm.*, pp. 849–850 (1998), disclose diimine-based ligands for Group 8–10 metal compounds shown to be suitable for ionic activation and olefin polymerization. See also WO 97/48735. Transition-metal catalyst systems from Group 5–10 metals in which the active transition metal center is in a high oxidation state and stabilized by low coordination number, polyanionic ancillary ligand systems are described in U.S. Pat. No. 5,502,124 and its divisional U.S. Pat. No. 5,504,049. See also the Group-5 organometallic catalyst compounds of U.S. Pat. No. 5,851,945 and the tridentate-ligand-containing, Group 4–9 organometallic catalyst compounds of copending U.S. application Ser. No. 09/302243, filed Apr. 29, 1999, now U.S. Pat No. 6,294,495 and its equivalent PCT/US99/09306. Group-11 catalyst precursor compounds, activated with ionizing cocatalysts, and useful for polymerizing of olefins and vinyl-group-containing polar monomers are described and exemplified in WO 99/30822 and its priority document, including U.S. Pat. No. application Ser. No. 08/991,160, filed Dec. 16, 1997 now abandoned. Each of these documents is incorporated by reference for the purposes of U.S. patent practice.

U.S. Pat. No. 5,318,935 describes bridged and unbridged bisamido transition-metal compounds of Group-4 for olefin polymerization catalysts are described by D. H. McConville, et al, in *Organometallics* 1995, 14, 5478–5480. Further work appearing in D. H. McConville, et al, *Macromolecules*, 1996, 29, 5241–5243, described bridged bis(arylamido) Group-4 compounds that are active catalysts for polymerization of 1-hexene. See also WO 98/37109. Additional transition metal compounds suitable for invention embodiments include those described in WO 96/40805. Cationic Group-3 or Lanthanide metal complexes for olefin polymerization are disclosed in copending U.S. application Ser. No. 09/408050, filed Sep. 29, 1999 (Atty. Docket No. 98B054) now U.S. Pat. No. 6,403,773, and its equivalent PCT/US99/22690. The precursor compounds are stabilized by monoanionic bidentate ligands and two monoanionic ligands. Invention cocatalysts can activate these precursor compounds. Each of these documents is incorporated by reference for the purposes of U.S. patent practice.

Additional catalyst precursors are described in the literature, any of which are suitable where they contain, or can be modified to contain, ligands capable of being abstracted for ionization of the organometallic compounds. See, for instance, V. C. Gibson, et al, "The Search for New-Generation Olefin Polymerization Catalysts: Life Beyond Metallocenes", *Angew. Chem. Int. Ed.*, 38, 428–447 (1999), incorporated by reference for the purposes of U.S. patent practice.

When using the invention catalysts, particularly when they are support bound, the total catalyst system will optionally contain one or more scavenging compounds. The term "scavenging compounds" as used in this application includes compounds that remove polar impurities (catalyst poisons) from the reaction environment. Impurities can be introduced with the reaction components, particularly solvent, monomer, and catalyst feeds. These impurities vitiate catalyst activity and stability, particularly when ionizing-anion-precursors activate the catalyst system. These impurities include water, oxygen, metal impurities, etc. Typically, they are limited or eliminated before introducing the reaction components into the vessel, but some scavenging compound will normally be used in the polymerization process.

Typically, the scavenger will be an excess of the alkylated Lewis acids needed for activation, as described above, or will be known organometallic compounds such as the Group-13 organometallic compounds of U.S. Pat. Nos. 5,153,157, 5,241,025, 5,767,587 and WO-A-91/09882, WO-A-94/03506, WO-A-93/14132, and that of WO 95/07941. Exemplary compounds include triethyl aluminum, triethyl borane, triisobutyl aluminum, methylalumoxane, isobutyl aluminumoxane, and tri-n-octyl aluminum. Those scavenging compounds having bulky or $C_6$–$C_{20}$ linear hydrocarbyl substituents bound to the metal or metalloid center minimize adverse scavenger interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, or tri-n-dodecylaluminum. Alumoxanes also may be used in scavenging amounts with other activation methods, e.g., methylalumoxane and triisobutyl-aluminoxane. The amount of scavenging agent to be used with the invention Group 3–10 catalyst compounds is minimized to the amount that enhances activity and is omitted altogether if the feeds and polymerization medium are pure enough.

Some catalyst embodiments are useful with polymerizable monomers. Suitable conditions are well known and include solution polymerization, slurry polymerization, and high-pressure polymerization. The invention catalyst is supported as described and will be particularly useful in the known reactor operating modes employing fixed-bed, moving-bed, fluid-bed, slurry, or solution processes conducted in single, series, or parallel reactors.

The liquid processes comprise contacting olefin monomers with the above-described catalyst system in a suitable diluent or solvent and allowing those monomers to react long enough to produce the invention copolymers. Both aliphatic and aromatic hydrocarbyl solvents are suitable; aliphatic solvents such as cyclopentane or hexane are used in some embodiments. In bulk and slurry processes, catalysts are typically brought into contact with a liquid monomer slurry, such as propylene, or monomer in a liquid diluent, such as ethylene in 1-hexene or 1-octene in n-butane. Representative reaction temperatures and pressure for different embodiments are shown in Table I.

TABLE I

| Reaction Temperature and Reaction Pressure | |
|---|---|
| Embodiment | Reaction Temperature in ° C. |
| A | ≦220 |
| B | ≧40 |
| C | ≦250 |
| D | ≧60 |

TABLE I-continued

| Reaction Temperature and Reaction Pressure | |
|---|---|
| Embodiment | Reaction Pressure in bar |
| E | ≦2500 |
| F | ≧0.1 |
| G | ≦500 |
| H | ≦1600 |
| I | ≧1.0 |
| J | ≧0.001 |

Linear polyethylene, including high- and ultra-high-molecular weight polyethylenes, including both homo- and copolymers with other α-olefin monomers, α-olefinic or non-conjugated diolefins, for example, $C_3$–$C_{20}$ olefins, $C_5$–$C_{20}$ diolefins, $C_7$–$C_{20}$ vinyl aromatic monomers (such as styrene) or $C_5$–$C_{20}$ cyclic olefins, are produced by adding ethylene, and optionally one or more other monomers, to a reaction vessel, or more than one vessel in parallel or series, under low pressure (typically <50 bar), at a typical temperature of 40–250° C. These are placed together with invention, supported catalysts suspended in a solvent or diluent, such as hexane or toluene. Cooling typically removes polymerization heat. See, U.S. Pat. Nos. 4,543,399, 4,588,790, 5,028,670 and 5,405,922 and 5,462,999, which are incorporated by reference for purposes of U.S. patent practice.

Semicrystalline polypropylenes can also be prepared with the invention process, particularly those having 0.1–30 mol %, more preferably 7–25 mol %, of ethylene or higher α-olefins. Polymers having sufficient ethylene or other comonomer content to render them substantially soluble in hexane are particularly suitable for preparation in stirred-tank reactors, tubular reactors, or any combination of stirred-tank or tubular reactors in parallel or series operation with the invention catalysts.

High molecular weight, low crystallinity ethylene-α-olefin elastomers (including ethylene-cyclic-olefin and ethylene-α-olefin-diolefin) can be prepared using invention catalysts under traditional solution polymerization processes or by introducing ethylene gas into a slurry using α-olefin, cyclic olefin, or their mixtures with other compounds, polymerizable or not, as diluents for suspending invention catalysts. Typical ethylene pressures will be between 10 and 1000 psig (69–6895 kPa), and the diluent temperature will typically be between 40 and 160° C. The process can be carried out in a stirred tank reactor, or more than one operated in series or parallel. See the general disclosure of U.S. Pat. No. 5,001,205 for general process conditions. See also, International Applications WO 96/33227 and WO 97/22639. All documents are incorporated by reference for purposes of U.S. Patent Practice.

Some invention process embodiments are particularly applicable to substantially adiabatic, homogeneous solution polymerization. Adiabatic processes are those in which polymerization heat is accommodated by allowing a temperature rise in the reactor contents, here principally solvent or diluent. Typically, in these processes, no internal cooling is absent and external cooling is unnecessary. The reactor outlet stream removes reaction heat from the reactor. Cooling the solvent or monomer stream(s) before they enter these reactors improves productivity because it permits a greater polymerization exotherm. Thus, the catalyst, cocatalyst, and scavenger selections disclosed in this application can be advantageously practiced in a continuous, solution process operated at or above 140° C., above 150° C. or above 160°

C., up to about 250° C. Typically, this process is conducted in an inert linear, cyclic or branched aliphatic or aromatic solvent, at a pressure of from 10 to 200 bar. These catalysts' provision of desirable polymer at elevated temperatures contributes to a greater exotherm, to high polymer content in the reactor because of lower viscosity, to reduced energy consumption in evaporating and recycling solvent, and to better monomer and comonomer conversions. See, for example, U.S. Pat. No. 5,767,208, and co-pending U.S. application Ser. No. 09/261,637, filed Mar. 3, 1999 now U.S. Pat. No. 6,291,609, and its equivalent WO 99/45041, all of which are incorporated by reference for purposes of U.S. patent practice.

Ethylene-containing polymers for electrical devices are described more particularly in the literature. See, for example, U.S. Pat. Nos. 5,246,783, 5,763,533, and International Publication WO 93/04486. Each of these polymers can be prepared in the manner described in the preceding paragraphs. Other olefinically-unsaturated monomers besides those specifically described in these documents may be polymerized using the invention catalysts as well, for example, styrene, alkyl-substituted styrenes, isobutylene, and other geminally-disubstituted olefins, ethylidene, norbornene, norbornadiene, dicyclopentadiene, and other olefinically-unsaturated monomers, including other cyclic olefins, such as cyclopentene, norbornene, and alkyl-substituted norbornenes. See, for example, U.S. Pat. Nos. 5,635,573, and 5,763,556. Additionally, α-olefinic macromonomers of 1000 mer units or more, may also be comonomers yielding branch-containing polymers. Each of the foregoing references are incorporated by reference for their relevant teachings.

Invention catalysts can function individually or can be mixed with other catalyst to form a multi-component system. Monomer and coordination-catalyst-blend selection yield polymer blends prepared under conditions analogous to those using individual catalysts. Polymers having increased MWD for improved processing and other traditional benefits available from polymers made with mixed catalyst systems can thus be achieved.

Blended polymer formation can be achieved ex situ through mechanical blending or in situ through the use of mixed catalysts. Generally, in situ blending provides a more homogeneous product and allows one-step blend production. In situ blending using mixed catalysts involves combining more than one catalyst in the same reactor to simultaneously produce multiple, distinct polymer products. This method requires additional catalyst synthesis. Moreover, the catalyst components must be matched for the polymer products they generate at specific conditions and for their response to changes in polymerization conditions.

The following examples are presented to illustrate the foregoing discussion. All parts, proportions and percentages are by weight unless otherwise indicated. All examples were carried out in dry, oxygen-free environments and solvents. Although the examples may be directed to certain embodiments of the present invention, they do not limit the invention in any specific respect.

EXAMPLES

Materials

Toluene was purged with $N_2$ for 5 min, then dried over molecular sieves overnight. The toluene was poured down a basic-$Al_2O_3$ column before use. Tris(pentafluorophenyl) boron from Aldrich was dissolved in pentane and filtered with a 0.45 μm filter. It was recrystallized from n-pentane in a freezer and vacuum dried at room temperature. Diethylaniline from Aldrich was dried over $CaH_2$ overnight and passed through a basic-$Al_2O_3$ column before use. 1-hexene was dried over $CaH_2$ overnight and similarly passed through a basic-$Al_2O_3$ column before use.

Example A

Cabosil was prepared by heating for 400° C. for 48 hrs followed by heating under vacuum at 200° C. for 6 hours. 0.54 g of the Cabosil was added to 30–40 mL dried toluene. 86 μL of prepared diethylaniline was added and stirred for 5 min. 0.2762 g of the recrystallized tris(pentafluorophenyl) boron was dissolved in 3 ml toluene and then slowly added to the silica-containing toluene solution. This mixture was stirred for 30 min at room temperature and then allowed to settle overnight. The toluene layer was removed by pipette and the wet slurry was dried under vacuum at room temperature to a produce a dry, free-flowing powder. The yield of silica-bound activator (SBA) was 0.6555 g Catalyst Preparation 263.88 mg of SBA was suspended in toluene and added to a toluene solution of 90.7 mg of μ-diphenylmethylene (cyclopentadienyl) (fluorenyl) hafnium dimethyl. The mixture was stirred for 30 min at room temperature. The resulting supported catalyst was vacuum dried at room temperature.

Polymerization I

In a dry box, a portion of a small spatula full of the supported catalyst prepared above was placed in a dried 20-mL vial. Approximately 5 mL of dried hexene-1 (passed through a basic-alumina column) was added to the vial in liquid form. After a short period of time, the vial became hot and the liquid became notably viscous. On completion, the hexene-1 polymerized to sufficient molecular weight that the viscous mass flowed only sluggishly when the vial was turned upside down. A few days after polymerization, the nonporous, pinkish orange, supported catalyst settled out from the polymer solution, leaving a clear solution behind. Further fractionation can allow for substantial separation of polymer from catalyst residue. Subsequent analysis by LDMS and ToF-SIMS showed insignificant labile anion presence, for both the separated polymer portion, and that with entrained residual catalyst. (Such use in the suspension polymerization of polypropylene so that with or without catalyst residue removal, effective grades for electrical grade polypropylene products, for example, capacitor grade polypropylene can be produced.)

Example B

Preparation of Cabosil 700

The silica was heated under a flow of dry nitrogen gas. A programmable temperature controller was used to run the temperature profile shown in the table below.

| Temperature (° C.) | Time (min) |
|---|---|
| 25 to 105 | 48 |
| 105 to 160 | 132 |
| 160 to 700 | 263 |
| 700 | 240 |
| 700 to 25 | 120 |

Example C

SBA-700 Preparation 2.669 g of Cabosil-700, prepared as in Example B, was suspended in 80 mL or toluene dried as described above. A solution of 0.106 μL DEA that had been diluted in 0.9 mL toluene was added. This mixture was stirred for 10 min at room temperature. A solution of 342 mg B(C6F5)3 dissolved in 5 mL of toluene at room temperature was added. The product was filtered from solution and washed with 80 mL of toluene. The filtering/washing steps were repeated two times. The product was vacuum dried at room temperature to a dry, free-flowing powder.

Example D

Catalyst Preparation 98.6 mg of SBA-700, produced in Example C, was slurried in 2.8 mL toluene. 3.74 mL of 6 mM rac-dimethylsilylbis(3-methyl-4-phenyl-indenyl)Zirconium $X_2$ in toluene was added to the SBA slurry. The mixture was stirred for 5 minutes. The product was filtered and then vacuum dried at room temperature.

Example E

Polymerization II 0.3 mL of one-tenth diluted TIBAL (in toluene) was placed into a steam dried 2L reactor. 300 mL of liquid propylene was added to the reactor. The reactor was then heated to 60° C. 100 mg of the Catalyst of Example D was flushed into the reactor with 100 mL of propylene. The polymerization was run for 30 minutes. The reactor was cooled and vented. The polymerization yielded 43.3 g of dried polypropylene (catalyst activity $7.81 \times 10^6$ g/mol-hr).

Comparative Examples and Experimental Data

Experimental data for LDMS and ToF-SIMS analyses of a series of EP copolymers made using soluble rac-dimethylsilyl bis(indenyl) hafnium dimethyl and [dimethylanilinium]$^+$[tetrakis(pentafluorophenyl)borate]$^-$ activator in a 1.0 L. continuous flow stirred tank reactor. All the polymerizations were carried out using between 13 and 97 equivalents of TIBAL. All polymerizations conducted at 110° C. with reactor residence time of 12.8 to 15.0 min.

Polymerization Procedure (Single Reactor)

Polymerizations were carried out in one, one-liter stirred reactor with continuous flow of feeds to the system and continuous withdrawal of products. The solvent was hexane. Monomers were ethylene and propylene, and were purified over beds of alumina and molecular sieves. All feeds were pumped into the reactors by metering pumps except for the ethylene (and hydrogen where applicable), which flowed as a gas under its own pressure through a mass flow meter/controller. Circulating water through a reactor-cooling jacket controlled reactor temperature. The reactors were maintained at a pressure in excess of the vapor pressure of the reactant mixture to keep the reactants in the liquid phase. The reactors were operated liquid full.

Ethylene and propylene feeds were combined into one stream and then mixed with a hexane stream that had been cooled to 0° C. A hexane solution of triisobutyl aluminum scavenger was added to the combined solvent and monomer stream just before it entered the reactor to further reduce the concentration of any catalyst poisons. The catalyst components in solvent (usually toluene or toluene/hexane mixtures) were separately pumped to the reactor and, in most cases, activated in-line just before the reactor, then the activated catalyst entered the reactor through a separate port outfitted with a dip tube to ensure adequate distribution. The polymer/solvent/unconverted monomers and catalyst solution exit the first reactor through a pressure control valve that reduced the pressure to atmospheric. This caused the unconverted monomers in the solution to flash into a vapor phase. The gas was vented from the top of a vapor-liquid separator. The liquid phase, including, for the most part, polymer and solvent, flowed out the bottom of the separator and was collected for polymer recovery. After removing a small portion for determining cement concentration, stabilizer was added to the polymer solution. The stabilized polymer was recovered from solution by either steam stripping followed by vacuum drying, or by solvent evaporation over heat and vacuum drying. Some comparative polymerization data are summarized in Table 1.

TABLE 1

Summary of EP Copolymers Analyzed

| Samples | Catalyst Eff (g/g) | Est. wppm of $B(C_6F_5)_4$ | Scav/Cat (mol/mol) | Wt % $C_2$ | Polymer Wt. Avg. MW (GPC) |
|---|---|---|---|---|---|
| AA | 17757 | 32 | 33 | 63.8 | 202,000 |
| BB | 11607 | 50 | 70.3 | 70.6 | 272,000 |
| CC | 24509 | 22 | 13.2 | 58.6 | 166,000 |
| DD | 4810 | 120 | 97.1 | 72.9 | 288,000 |

All four samples were analyzed by LDMS and ToF-SIMS. In all cases the $B(C_6F_5)_4$ anion was readily detected. The match of peak intensities and masses with those calculated for $B(C_6F_5)_4$ anion established its identity. All mass spectra were recorded using a PHI-Evans triple sector electrostatic analyzer time-of-flight mass spectrometer equipped with dual multichannel plate detector, $^{115}$In ion gun and nitrogen laser ($\lambda$=337 nm). The ion gun was operated at 15 keV and 600 pA. For LDMS, 100–300 laser shots were used to acquire the spectrum. Laser power was ~$10^7$ watts/cm$^2$. External and internal mass calibration was carried out using a variety of known molecular standards and identities of well-established peaks in each mass spectrum.

Samples were prepared for analysis in two ways. In the first, a portion of the polymer was extracted with 5 mL of 90° C. toluene. After extraction for about 10 min. in a glass vial, approximately 1 $\mu$L of the solution was deposited on a clean silicon wafer. In the second, a portion of polymer was cross-sectioned to expose the interior, and the freshly exposed surface was analyzed directly.

Use of known masses and isotope distributions of relevant elements, below,

| B | 10.0129 (19.7%) | 11.0093 (80.3%) |
| C | 12.0000 (98.89%) | 13.00335 (1.11%) |
| F | 18.9984 (100%) | | with the stoichiometry of the $[B(C_6F_5)_4]^-$ anion results in the calculated values below.

| Mass | 677.98 | 678.97 | 679.98 | 680. |
| Intensity, % | 23 | 100 | 23 | 3 |

The negative ion LDMS mass spectrum of the pure [DMAH][B(C$_6$F$_5$)$_4$] salt provided two major peaks, one at m/z=679 due to the intact $B(C_6F_5)_4$ anion, and a second at 167 due to $(C_6F_5)^-$. Along with peaks due to additives and copolymer, a fingerprint at m/z=679 was observed. The 600 to 700 region of this spectrum clearly showed that the peak nominally at m/z 679 in fact consisted of four peaks. These peaks are due to the contributions of $^{10}$B (abundance 19.7%) and $^{13}$C (abundance 1.11%) isotopes to the mass spectrum of the Samples of Table 1. There was an excellent match between the experimentally measured and calculated intensities of the peaks due to the isotope contributions. Such an excellent match between calculated and measured isotope patterns was found in all the m/z=679 spectra for the pure salt and the Samples. In addition to the isotope pattern match, the exact mass measured for each of the four peaks in all the spectra also matched, within experimental error, those calculated for the $B(C_6F_5)_4$ anion.

In contrast, similar LDMS and ToF-SIMS analysis of isotactic polypropylene prepared with a supported catalyst made in accordance with procedures of reported Example 9 of U.S. Pat. No. 5,643,847, and having the support bound anion as described therein, did not contain signatures of any $B(C_6F_5)_x$ anions, where x specifically includes 3 or 4. Thus, using reference procedures, no evidence of the anion can be found in the invention support bound cocatalysts. Yet, anion can be found in systems that do not use support bound cocatalysts. See, e.g. P. Brant, K.-J. Wu "Detection of B(C6F5)4 anions in polyethylenes made with ionic metallocene catalysts." Journal of Materials Science Letters 19 (2000) 189–191.Therefore, the dielectric advantages of the supported catalyst of this ionic catalyst supporting technique can be extended from the taught gas phase and slurry polymerization processes to solution polymerization processes when using the support substrate materials of this application.

I claim:

1. Sheathing for an electrical device or an electrical cable comprising at least one polyolefin resin wherein the resin has been prepared by contacting olefin monomers under essentially solution- or supercritical-phase polymerization conditions with an activated, Group 3–11 organometallic catalyst compound that has been activated with a support-bound noncoordinating or weakly coordinating borate or aluminate anion, the support being finely divided fumed nonporous substrate particles which are soluble or suspendable in the polymerization solvents or diluents.

2. Sheathing according to claim 1 wherein the support comprises pyrogenic silica.

3. Sheathing according to claim 1 wherein the hydrocarbyl polymer chains are comprised of units derived from olefins.

4. Sheathing according to claim 3 wherein the hydrocarbyl chains are soluble in aliphatic solvents.

5. Sheathing according to claim 1 wherein the organometallic catalyst compound is a Group 3–6 metal compound containing a cyclopentadienyl-group.

6. Sheathing according to claim 5 wherein the metal is titanium and the metal compound contains only one pi-bound cyclopentadienyl group.

7. Sheathing according to claim 5 wherein the metal compound comprises at least one biscyclopentadienyl zirconium or hafnium compound.

8. Sheathing according to claim 1 wherein the resin contains units derived from ethylene.

9. Sheathing according to claim 8 wherein the resin is an ethylene polymer comprising monomer units derived from at least one $C_3$–$C_{12}$ olefins or non-conjugated diolefins.

* * * * *